(12) United States Patent
Kim

(10) Patent No.: US 8,653,770 B2
(45) Date of Patent: Feb. 18, 2014

(54) MOTOR CONTROL SYSTEM

(75) Inventor: Jong Owan Kim, Hwaseong-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 2 days.

(21) Appl. No.: 13/311,092

(22) Filed: Dec. 5, 2011

(65) Prior Publication Data

US 2012/0146560 A1 Jun. 14, 2012

(30) Foreign Application Priority Data

Dec. 13, 2010 (KR) .................. 10-2010-0126853

(51) Int. Cl.
*H03K 5/00* (2006.01)

(52) U.S. Cl.
USPC .............. 318/400.13; 318/400.04; 318/599

(58) Field of Classification Search
USPC .................. 318/400.13, 52, 400.04
See application file for complete search history.

(56) References Cited

U.S. PATENT DOCUMENTS

| | | | |
|---|---|---|---|
| 2008/0079407 A1* | 4/2008 | Shimada et al. | 323/283 |
| 2008/0204161 A1* | 8/2008 | Makita et al. | 332/109 |
| 2008/0238391 A1* | 10/2008 | Williams et al. | 323/283 |
| 2009/0296805 A1* | 12/2009 | Takahashi | 375/238 |
| 2010/0289681 A1* | 11/2010 | Kamikisaki | 341/122 |

* cited by examiner

*Primary Examiner* — Eduardo Colon Santana
*Assistant Examiner* — Bickey Dhakal
(74) *Attorney, Agent, or Firm* — Staas & Halsey LLP

(57) ABSTRACT

A motor control system includes a power supply to supply current to a motor, a shunt resistor provided at one side of the motor to measure the magnitude of current supplied to the motor, a differential amplifier to receive a voltage applied to both ends of the shunt resistor as an input signal and amplify the input signal, an Analog/Digital Converter (ADC) to convert an analog signal generated from the differential amplifier into a digital signal, a switch to switch current applied to the motor by the power supply, and a microcontroller to generate a Pulse Width Modulation (PWM) control signal so as to control ON or OFF of the switch and generate an operation start signal of the ADC by considering the PWM control signal and a hardware delay value of the differential amplifier.

13 Claims, 4 Drawing Sheets

MOTOR CONTROL SYSTEM

CROSS-REFERENCE TO RELATED APPLICATIONS

This application claims the benefit of Korean Patent Application No. 10-2010-0126853, filed on Dec. 13, 2010 in the Korean Intellectual Property Office, the disclosure of which is incorporated herein by reference.

BACKGROUND

1. Field

Embodiments of the present disclosure relate to a motor control system for feedback based current control.

2. Description of the Related Art

Generally, motors are used as driving sources of a variety of devices. A motor includes a control circuit including a plurality of switching elements to control the rotational driving thereof. The motor includes a roughly cylindrical stator having coils of a plurality of phases, and a rotor having a plurality of magnets and rotatably constructed with respect to the stator. A control circuit of a general motor sequentially applies current to the coils of the plurality of phases according to the switching operation of the switching elements to form a rotating magnetic field within the stator, thereby rotatably driving the rotor having the magnets.

Meanwhile, the motor may be controlled using current. To this end, a phase current of the motor must be fed back. A shunt resistance may be used for measuring the phase current of the motor. In the motor, current is controlled by a Pulse Width Modulation (PWM) scheme, and a shunt resistor having a low cost is connected to a phase signal stage of the motor to measure the controlled current. A voltage across both ends of the shunt resistor is input to an analog/digital converter and a value output from the analog/digital converter is used as a feedback current value.

SUMMARY

Therefore, it is an aspect of the present disclosure to provide a motor control system to synchronize a conversion operation time point of an analog/digital converter with a switching time point of a power supply according to a PWM control signal.

Additional aspects of the disclosure will be set forth in part in the description which follows and, in part, will be apparent from the description, or may be learned by practice of the disclosure.

In accordance with one aspect of the present disclosure, a motor control system includes a power supply to supply current to a motor, a shunt resistor provided at one side of the motor to measure the magnitude of current supplied to the motor, a differential amplifier to receive a voltage applied to both ends of the shunt resistor as an input signal and amplify the input signal, an Analog/Digital Converter (ADC) to convert an analog signal generated from the differential amplifier into a digital signal, a switch to switch current applied to the motor by the power supply, and a microcontroller to generate a Pulse Width Modulation (PWM) control signal so as to control ON or OFF of the switch and generate an operation start signal of the ADC by considering the PWM control signal and a hardware delay value of the differential amplifier.

The microcontroller may include a register to store a duty ratio of the PWM control signal so that the PWM control signal is generated every predetermined time, a counter to count time so as to control an output timing of the PWM control signal, and a comparator to generate the PWM control signal according to the duty ratio of the PWM control signal stored in the register and the counted time.

The microcontroller may include a register to store a duty ratio of the PWM control signal and a hardware delay value of the differential amplifier, a counter to count time so as to control an output timing of the operation start signal, and a comparator to generate the operation start signal of the ADC according to the duty ratio of the PWM control signal, the hardware delay value of the differential amplifier, and the counted time.

The ADC may transmit the digital signal to the microcontroller and wherein the microcontroller includes a current calculator to calculate the magnitude of current flowing into the motor according to the digital signal and a duty ratio of the PWM control signal.

The microcontroller may further include a motor power supply controller to control the magnitude of current flowing into the motor according to the calculated magnitude of current.

The motor power supply controller may control the magnitude of the current by adjusting the duty ratio of the PWM control signal.

The motor control system may further include an output buffer to accumulate the PWM control signal generated from the microcontroller and generate the PWM control signal when the PWM control signal is above a prescribed magnitude.

The switch may include a transistor, wherein an on or off interval of the transistor is controlled according to a duty ratio of the PWM control signal.

The motor control system may further include a diode to prevent a circuit damage due to abrupt inrush current caused by an inductor component of the motor.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
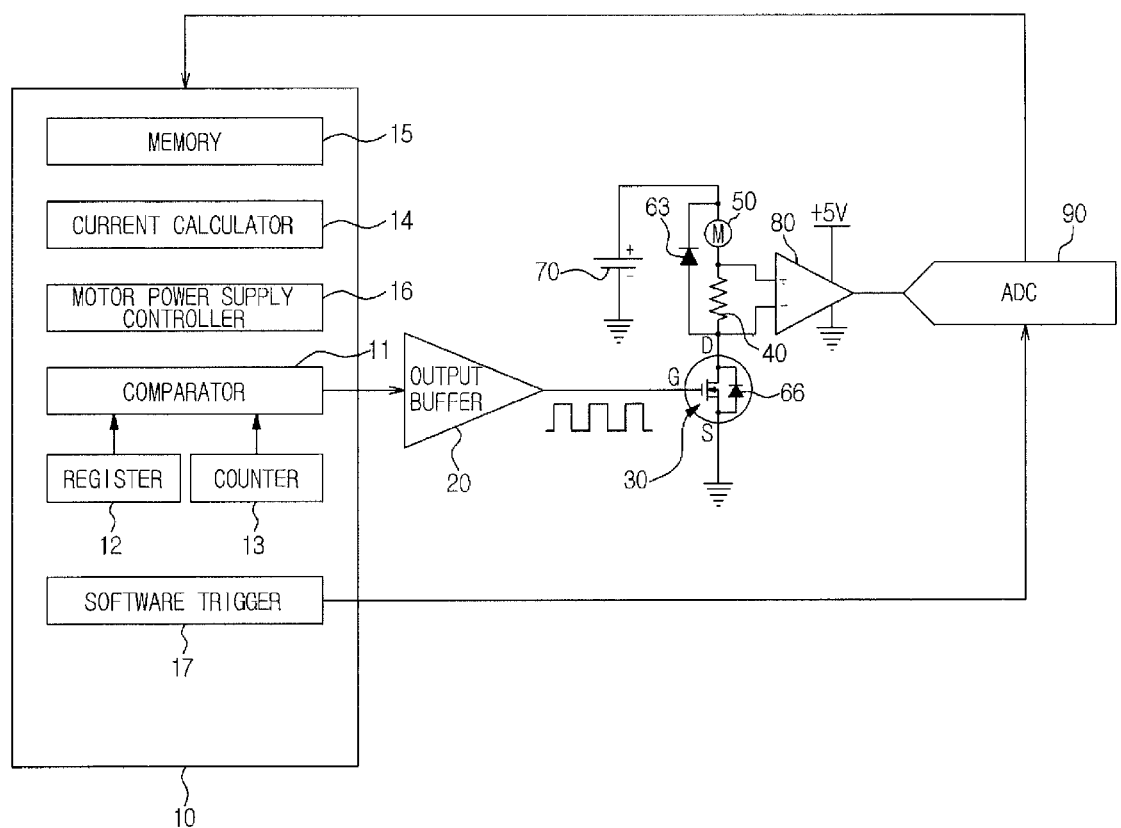
FIG. 1 is a diagram illustrating a general motor control system.

Reference will now be made in detail to the embodiments of the present disclosure, examples of which are illustrated in the accompanying drawings, wherein like reference numerals refer to like elements throughout.

FIG. 1 is a diagram illustrating a general motor control system.

The motor control system includes a microcontroller 10, an output buffer 20, a switch 30, a shunt resistor 40, a motor 50, first and second diodes 63 and 66, a power supply 70, a differential amplifier 80, and an Analog/Digital Converter (ADC) 90.

The microcontroller 10 includes a comparator 11, a register 12, a counter 13, a current calculator 14, a memory 15, a motor power supply controller 16, and a software trigger 17.

The comparator 11 of the microcontroller 10 generates a PWM control signal. Specifically, the comparator 11 generates a PWM control signal, using a duty ratio of a PWM control signal stored in the register 12 and a count value of the counter 13. The comparator 11 may check a time interval according to the count value generated from the counter 13. The comparator 11 controls an ON time of the duty ratio (ON time/period) of the PWM control signal in synchronization with the count value.

The register 12 of the microcontroller 10 stores the duty ratio of the PWM control signal. The register 12 stores an ON time per period of the PWM control signal.

The counter 13 of the microcontroller 10 counts time.

The software trigger 17 of the microcontroller 10 generates an operation start signal of the ADC 90 when a prescribed condition is satisfied within a control loop or at a predetermining timing.

The output buffer 20 accumulates PWM control signals generated from the microcontroller 10. Since the PWM control signals generated from the microcontroller 10 are logical voltages, their magnitudes are low. The output buffer 20 accumulates the PWM control signals until they are increased to a predetermined magnitude at which the switch 30 may operate. The output buffer 20 may be omitted according to a type of a motor control system.

The switch 30 may be comprised of a transistor. The transistor is turned on or off according to a signal applied to a gate G. The switch 30 is turned on or off according to a signal generated from the microcontroller 10. An ON/OFF interval of the switch 30 is adjusted according to the duty ratio of the PWM control signal generated from the microcontroller 10. The switch 30 is turned on at an ON time of the PWM control signal and is turned off at an OFF time of the PWM control signal.

The shunt resistor 40 is provided to measure current applied to the motor 50. Specifically, the shunt resistor 40 is a resistor to measure the magnitude of current applied to the motor 50 from the power supply 70. A voltage across both ends of the shunt resistor 40 is used as an input of the differential amplifier 80.

The motor 50 is driven by power supplied from the power supply 70. The power supplied the power supply 70 is adjusted according to whether the switch 30 is on or off to control operation of the motor 50.

The first and second diodes 63 and 66 are provided to protect the shunt resistor 40 etc. from damage due to abrupt current caused by an inductor component of the motor 50. The first diode 63 forms a closed circuit by being connected to the motor 50 and the shunt resistor 40 even when the switch 30 is turned off, thereby preventing abrupt current variation caused by an inductor component of the motor 50. The second diode 66 is connected to a drain D and a source S of the switch 30 so as not to generate abrupt current variation in the switch 30.

The power supply 70 supplies power to the motor 50. The power supply 70 may be a Switching-Mode Power Supply (SMPS). The SMPS converts commercial Alternating Current (AC) into Direct Current (DC).

The differential amplifier 80 receives a voltage across both ends of the shunt resistor 40 and differentially amplifies the voltage. The differential amplifier 80 is a circuit to amplify a voltage difference of voltage signals applied to two input terminals thereof. A circuit in which emitters of two transistors are combined may be used as the input terminals of the differential amplifier 80.

The ADC 90 converts a continuous analog input into a discontinuous digital output. The ADC 90 converts an input analog signal into a digital signal according to the operation start signal (or conversion start signal) transmitted by the microcontroller 10. The ADC 90 samples an analog signal whenever the operation start signal is received and converts the analog signal into a digital signal.

Meanwhile, the digital value generated from the ADC 90 is fed back to the microcontroller 10.

The current calculator 14 calculates the magnitude of current from the digital value generated from the ADC 90. The magnitude of current is the magnitude of current flowing into the motor 50 and may be calculated from a voltage across both ends of the shunt resistor 40 using. Ohm's law.

The motor power supply controller 16 may adjust a duty ratio of a PWM control signal so as to control an interval of power applied to the motor 50 according to the calculated current magnitude. The motor power supply controller 16 controls the ON/OFF interval of the switch 30 by adjusting a duty ratio of a PWM control signal according to the calculated current magnitude, thereby controlling supply of power to the motor 50.

Figure 2:
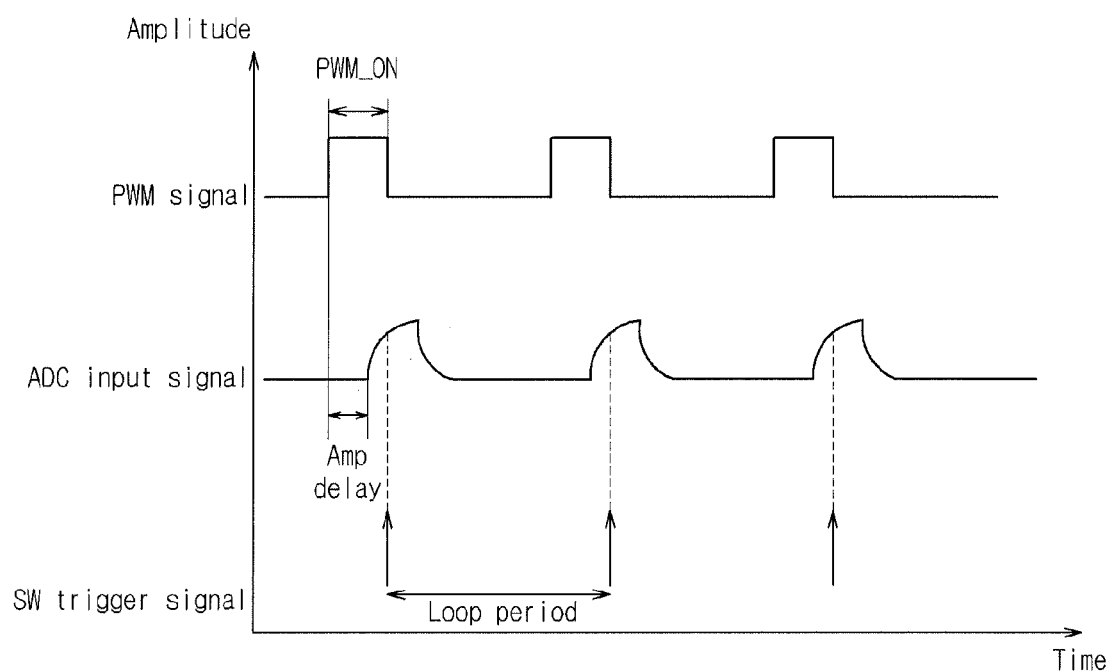
FIG. 2 is a timing chart of the motor control system of FIG. 1.

FIG. 2 is a timing chart of the motor control system of FIG. 1.

A PWM control signal generated from the comparator 11 of the microcontroller 10 is a signal of a prescribed period having a variable ON time. The microcontroller 10 adjusts the ON time of the PWM control signal so that a supply interval of power supplied to the motor 50 by the power supply 70 may be adjusted.

It will be appreciated that an ADC input signal generated from the differential amplifier 80 is delayed compared with a period of the PWM control signal due to a hardware problem of the differential amplifier 80.

The software trigger 17 of the microcontroller 10 generates an operation start signal of the ADC 90. The software trigger 17 generates a software trigger signal within a control loop of the motor control system. Accordingly, the software trigger signal input to the ADC 90 is a signal which does not compensate for a hardware delay. In this case, a timing of an analog signal sampled to be converted in the ADC 90 does not consider the hardware delay and thus timings of the PWM control signal and the software trigger signal are not synchronized. A motor control system to solve this problem according to an aspect of the disclosure will now be described.

Figure 3:
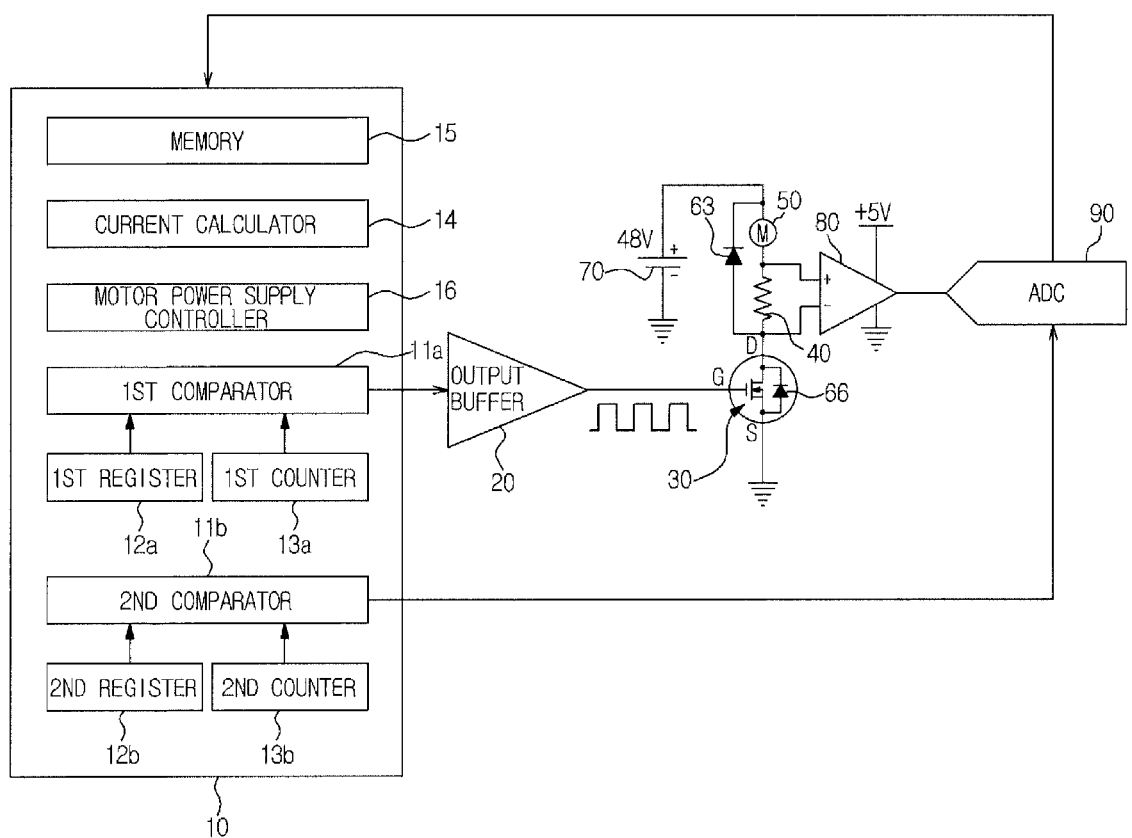
FIG. 3 is a diagram illustrating a motor control system according to an exemplary embodiment of the present disclosure.

FIG. 3 is a diagram illustrating a motor control system according to an exemplary embodiment of the present disclosure.

The motor control system may include a microcontroller 10, an output buffer 20, a switch 30, a shunt resistor 40, a motor 50, first and second diodes 63 and 66, a power supply 70, a differential amplifier 80, and an Analog/Digital Converter (ADC) 90.

The microcontroller 10 may include first and second comparators 11a and 11b, first and second registers 12a and 12b, first and second counters 13a and 13b, a current calculator 14, a memory 15, and a motor power supply controller 16.

The first comparator 11a of the microcontroller 10 generates a PWM control signal. Specifically, the first comparator 11a generates a PWM control signal, using a duty ratio of a PWM control signal stored in the first register 12a and a count value of the first counter 13a. The first comparator 11a may check a time interval according to the count value generated from the first counter 13a. The first comparator 11a controls an ON time of the duty ratio (ON time/period) of the PWM control signal in synchronization with the count value.

The first register 12a of the microcontroller 10 stores the duty ratio of the PWM control signal. The first register 12a stores an ON time per period of the PWM control signal. Values stored in the first register 12a may vary according to design or user selection. The duty ratio of the PWM control signal stored in the first register 12a may vary according to a feedback current value. If the feedback current value is large, the duty ratio of the PWM control signal stored in the first register 12a may be converted into a duty ratio in which the ON time is reduced, and if the feedback current value is small, the duty ratio of the PWM control signal stored in the first register 12a may be converted into a duty ratio at which the ON time is increased.

The first counter 13a of the microcontroller 10 counts time.

The second comparator 11b of the microcontroller 10 may generate an operation start signal of the ADC 90. The second comparator 11b may generate the operation start signal of the ADC 90 using the duty ratio of the PWM control signal stored in the second register 12b, a hardware delay value, and a count value of the second counter 13b. The hardware delay value is a delayed time while a voltage across the shunt resistor 40 by power generated from the power supply according to the PWM control signal generated from the microcontroller 10 passes through the differential amplifier 80.

For example, assuming that a signal delay value by the differential amplifier 80 shown in FIG. 3 is 'A', the second comparator 11b may generate the operation start signal of the ADC 90 according to the count value of the second counter 13b and a value obtained by adding the signal delay value 'A' to the PWM duty ratio. If the second comparator 11b generates the operation start signal of the ADC 90 using the above-described method, an ON/OFF interval of the power supply 70 and an operation start interval of the ADC 90 according to the PWM control signal generated from the first comparator 11a are the same.

The second register 12b of the microcontroller 10 stores the duty ratio of the PWM control signal. The second register 12b stores an ON time per period of the PWM control signal. Values stored in the second register 12b may vary according to design or user selection. The duty ratio of the PWM control signal stored in the second register 12b may vary according to a feedback current value. If the feedback current value is large, the duty ratio of the PWM control signal stored in the second register 12b may be converted into a duty ratio at which the ON time is reduced, and if the feedback current value is small, the duty ratio of the PWM control signal stored in the second register 12b may be converted into a duty ratio at which the ON time is increased. The duty ratio of the PWM control signal stored in the second register 12b is the same as the duty ratio of the PWM control signal stored in the first register 12a.

The second counter 13b of the microcontroller 10 counts time. The time counted by the second counter 13b is the same as the time counted by the first counter 13a.

The output buffer 20 accumulates PWM control signals generated from the microcontroller 10. Since the PWM control signals generated from the microcontroller 10 are logical voltages, their magnitudes are low. The output buffer 20 accumulates the PWM control signals until they are increased to a predetermined magnitude at which the switch 30 may operate. The output buffer 20 may be omitted according to a type of a motor control system.

The switch 30 may be comprised of a transistor. The transistor is turned on or off according to a signal applied to a gate G. The switch 30 is turned on or off according to a signal generated from the microcontroller 10. An ON/OFF interval of the switch 30 is adjusted according to the duty ratio of the PWM control signal generated from the microcontroller 10. The switch 30 is turned on at an ON time of the PWM control signal and is turned off at an OFF time of the PWM control signal. Although in FIG. 3 the PWM control signal generated from the microcontroller 10 is transmitted to the switch 30 via the output buffer 20, it is apparent that the PWM control signal may be directly transmitted to the switch 30 from the microcontroller 10.

The shunt resistor 40 is provided to measure current applied to the motor 50. Specifically, the shunt resistor 40 is a resistor to measure the magnitude of current applied to the motor 50 from the power supply 70. A voltage across both ends of the shunt resistor 40 is used as an input of the differential amplifier 80.

The motor 50 is driven power supplied from the power supply 70. The power supplied from the power supply 70 is adjusted according to whether the switch 30 is on or off to control operation of the motor 50.

The first and second diodes 63 and 66 are provided to protect the shunt resistor 40 etc. from damage due to abrupt current caused by an inductor component of the motor 50. The first diode 63 forms a closed circuit by being connected to the motor 50 and the shunt resistor 40 even when the switch 30 is turned off, thereby preventing abrupt current variation caused by an inductor component of the motor 50. The second diode 66 is connected to a drain D and a source S of the switch 30 so as not to generate abrupt current variation in the switch 30.

The power supply 70 supplies power to the motor 50. The power supply 70 may be a Switching-Mode Power Supply (SMPS). The SMPS converts commercial AC into DC.

The differential amplifier 80 receives a voltage across both ends of the shunt resistor 40 and differentially amplifies the voltage. The differential amplifier 80 is a circuit to amplify a voltage difference of voltage signals applied to two input terminals thereof. A circuit in which emitters of two transistors are combined may be used as the input terminals of the differential amplifier 80.

The ADC 90 converts a continuous analog input into a discontinuous digital output. The ADC 90 converts an input analog signal into a digital signal according to the operation start signal (or conversion start signal) transmitted by the microcontroller 10. The ADC 90 samples an analog signal whenever the operation start signal is received and converts the analog signal into a digital signal. Since a sampling timing of an analog signal by the ADC 90 should be synchronized with a timing of an analog signal generated from the differential amplifier 80, an operation start time point of the ADC 90 is controlled by adding a delay value of the differential amplifier 80 to the PWM signal.

Meanwhile, the digital value generated from the ADC 90 is fed back to the microcontroller 10.

The current calculator 14 of the microcontroller 10 calculates the magnitude of current applied to the motor 50 by receiving a digital value which is generated from the ADC 90 and fed back to the microcontroller 10. The current calculator 14 calculates the current using the digital value generated from the ADC 90 and the duty ratio of the PWM control signal. The current calculator 14 calculates the current by the following Equation 1.

Magnitude of current=Output value of ADC*Duty ratio of PWM control signal    (1)

In Equation (1), the duty ratio is an ON time/period and the magnitude of current denotes an average magnitude of current per period.

The current calculator 14 may control current applied to the motor 50 by adjusting the duty ratio of the PWM control signal according to a value of current flowing into the motor 50.

The motor power supply controller 16 may adjust the duty ratio of the PWM control signal so as to control an interval of power applied to the motor 50 according to the calculated current magnitude. The motor power supply controller 16 controls the ON/OFF interval of the switch 30 by adjusting the duty ratio of the PWM control signal according to the calculated current magnitude, thereby controlling supply of power to the motor 50.

Figure 4:
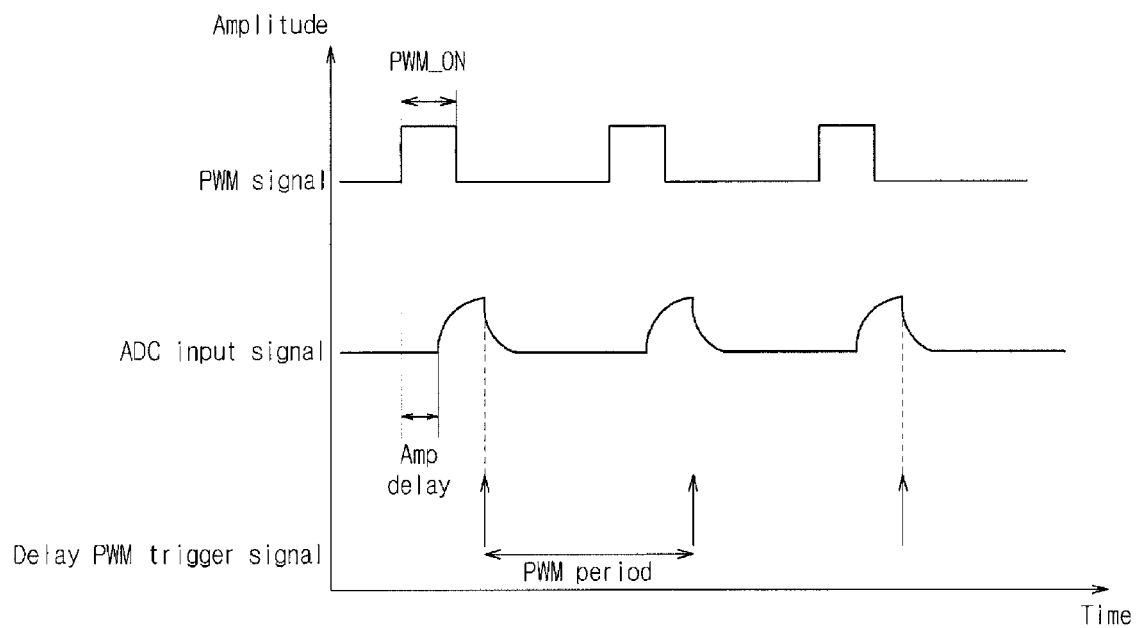
FIG. 4 is a timing chart of the motor control system according to an exemplary embodiment of the present disclosure.

FIG. 4 is a timing chart of the motor control system according to an exemplary embodiment of the present disclosure.

A PWM control signal generated from the first comparator 11a of the microcontroller 10 is a signal of a prescribed period having a variable ON time. The microcontroller 10 may adjust a supply interval of power supplied to the motor 50 by the power supply 7 by adjusting the ON time of the PWM control signal.

It will be appreciated that an ADC input signal generated from the differential amplifier 80 is delayed compared with a period of the PWM control signal due to a hardware problem of the differential amplifier 80. A delay value 'Amp delay' of a signal passing though the differential amplifier 80 is determined by experimentation during design. A designer may calculate a hardware delay value of the motor control system through experimentation etc. and may store the delay value in the memory 15 of the microcontroller 10.

A delay PWM trigger signal generated from the second comparator 11b is a signal generated in consideration of the hardware delay value. The delay PWM trigger signal is triggered so as to sample a time point at which a slope of the ADC input signal generated from the differential amplifier 80 is changed from a positive value to a negative value. The time point at which a slope of the ADC input signal generated from the differential amplifier 80 is changed from a positive value to a negative value is a time point at which the switch 30 is changed from an on state to an off state and the power generated from the power supply 70 is changed from a supply state to a non-supply state.

The ADC 90 converts an analog signal into a digital signal by sampling the ADC input signal at a time point at which a slope of the ADC input signal generated from the differential amplifier 80 is changed from a positive value to a negative value, and transmits the digital signal to the microcontroller 10. Referring to FIG. 4, the time point at which a slope of the ADC input signal generated from the differential amplifier 80 is changed from a positive value to a negative value is a point at which a value of the ADC input signal is a peak within one period, and a time connecting two time points at which the value of the ADC input signal is peak is one PWM period.

Meanwhile, dashed lines in FIG. 4 denote an ON time during which a power is supplied at one period. A current value is calculated under the assumption that current of a magnitude corresponding to a maximum amplitude value flows into the motor 50 during the ON time. That is, the dashed line part assumes that current having a heightened magnitude flows into the motor 50.

In the motor control system according to an aspect of the present disclosure shown in FIGS. 3 and 4, since the microcontroller 10 generates an operation start signal of the ADC 90 in synchronization with a timing of a signal input to the ADC 90, a hardware signal delay may be compensated.

As is apparent from the above description, an operation time point of the ADC may be controlled in consideration of a hardware delay of the motor control system.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A motor control system comprising:
   a power supply to supply current to a motor;
   a shunt resistor provided at one side of the motor to measure the magnitude of current supplied to the motor;
   a differential amplifier to receive a voltage applied to both ends of the shunt resistor as an input signal and amplify the input signal;
   an Analog/Digital Converter (ADC) to convert an analog signal generated from the differential amplifier into a digital signal;
   a switch to switch current applied to the motor by the power supply; and
   a microcontroller to generate a Pulse Width Modulation (PWM) control signal so as to control ON or OFF of the switch and generate an operation start signal of the ADC by considering the PWM control signal and a hardware delay value of the differential amplifier,
   wherein the microcontroller includes
   a register to store a duty ratio of the PWM control signal and a hardware delay value of the differential amplifier;
   a counter to count time so as to control an output timing of the operation start signal; and
   a comparator to generate the operation start signal of the ADC according to the duty ratio of the PWM control signal, the hardware delay value of the differential amplifier, and the counted time.

2. The motor control system of claim 1, wherein the microcontroller further includes:
   a register to store a duty ratio of the PWM control signal so that the PWM control signal is generated every predetermined time;
   a counter to count time so as to control an output timing of the PWM control signal; and
   a comparator to generate the PWM control signal according to the duty ratio of the PWM control signal stored in the register and the counted time.

3. The motor control system of claim 1, wherein the ADC transmits the digital signal to the microcontroller and wherein the microcontroller includes a current calculator to calculate the magnitude of current flowing into the motor according to the digital signal and a duty ratio of the PWM control signal.

4. The motor control system of claim 1, further comprising an output buffer to accumulate the PWM control signal generated from the microcontroller and generate the PWM control signal when the PWM control signal is above a prescribed magnitude.

5. The motor control system of claim 1, wherein the switch includes a transistor, wherein an on or off interval of the transistor is controlled according to a duty ratio of the PWM control signal.

6. The motor control system of claim 1, further comprising a diode to prevent a circuit damage due to abrupt inrush current caused by an inductor component of the motor.

7. The motor control system of claim 3, wherein the microcontroller further includes a motor power supply controller to control the magnitude of current flowing into the motor according to the calculated magnitude of current.

8. The motor control system of claim 7, wherein the motor power supply controller controls the magnitude of the current by adjusting the duty ratio of the PWM control signal.

9. A motor control system comprising:
   a power supply to supply current to a motor;
   a shunt resistor provided at one side of the motor to measure the magnitude of current supplied to the motor;

a differential amplifier to receive a voltage applied to both ends of the shunt resistor as an input signal and amplify the input signal;

an Analog/Digital Converter (ADC) to convert an analog signal generated from the differential amplifier into a digital signal;

a switch to switch current applied to the motor by the power supply; and a microcontroller to generate a Pulse Width Modulation (PWM) control signal so as to control ON or OFF of the switch and generate an operation start signal of the ADC by considering the PWM control signal and a hardware delay value of the differential amplifier, wherein the microcontroller includes
- first and second registers;
- first and second counters;
- first and second comparators;
- a current calculator;
- a memory; and
- a motor power supply controller, wherein the second comparator generates an operation start signal of the ADC using a duty ratio of the PWM control signal stored in the second register, a hardware delay value, and a count value of the second counter, the hardware delay value being a delayed time while a voltage across the shunt resistor by power generated from the power supply according to the PWM control signal generated from the microcontroller passes through the differential amplifier.

10. The motor control system of claim 9, wherein the first comparator generates the PWM control signal, using a duty ratio of a PWM control signal stored in the first register and a count value of the first counter.

11. The motor control system of claim 9, wherein the second register stores an ON time per period of the PWM control signal.

12. The motor control system of claim 9, wherein the first and second counters count time, and
the time counted by the second counter is the same as the time counted by the first counter.

13. The motor control system of claim 10, wherein the first comparator controls an ON time of the duty ratio of the PWM control signal in synchronization with the count value.

\* \* \* \* \*